Patented Dec. 19, 1922.

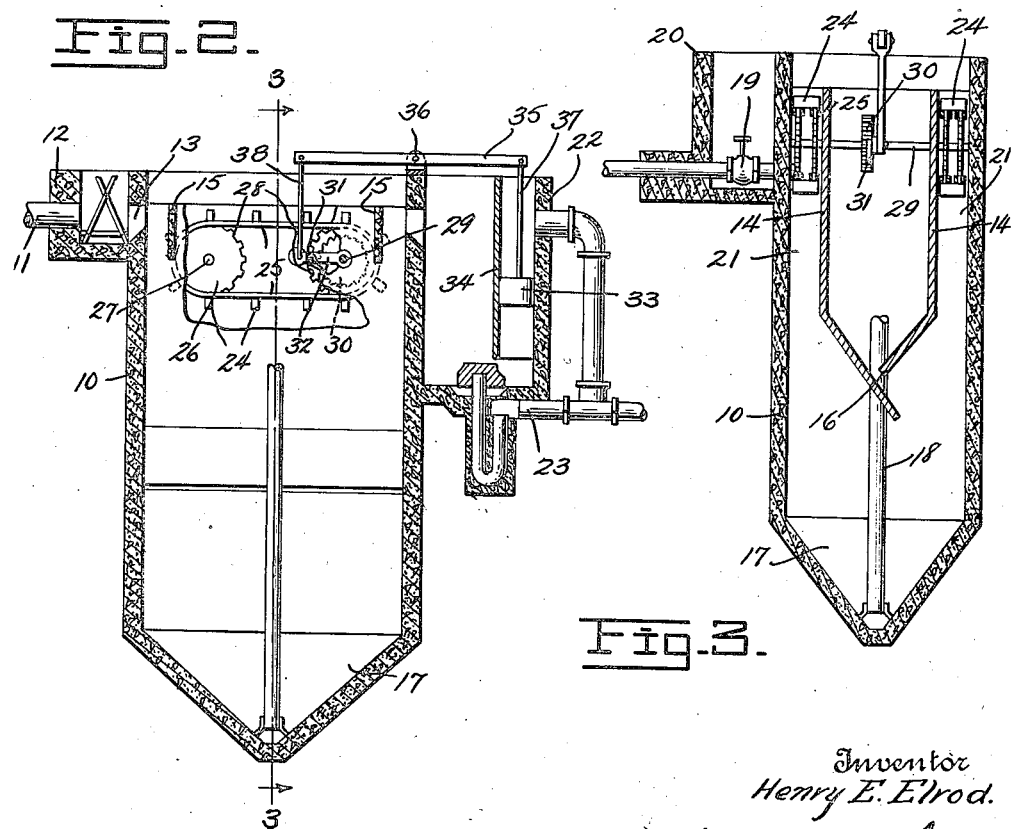

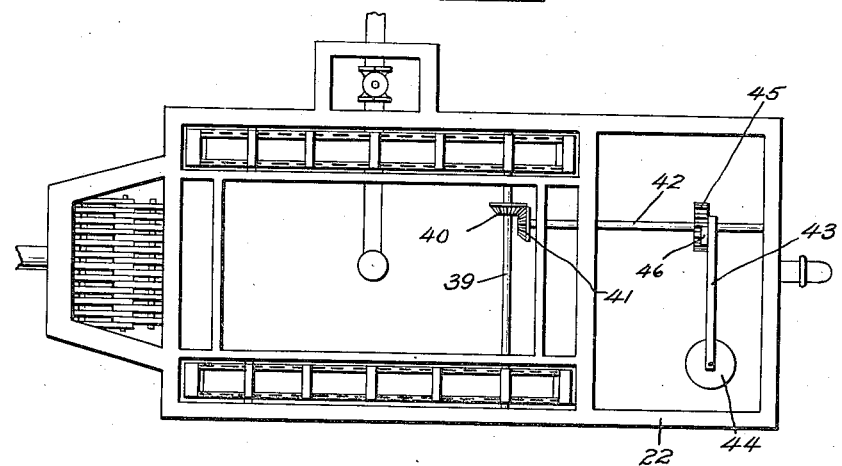
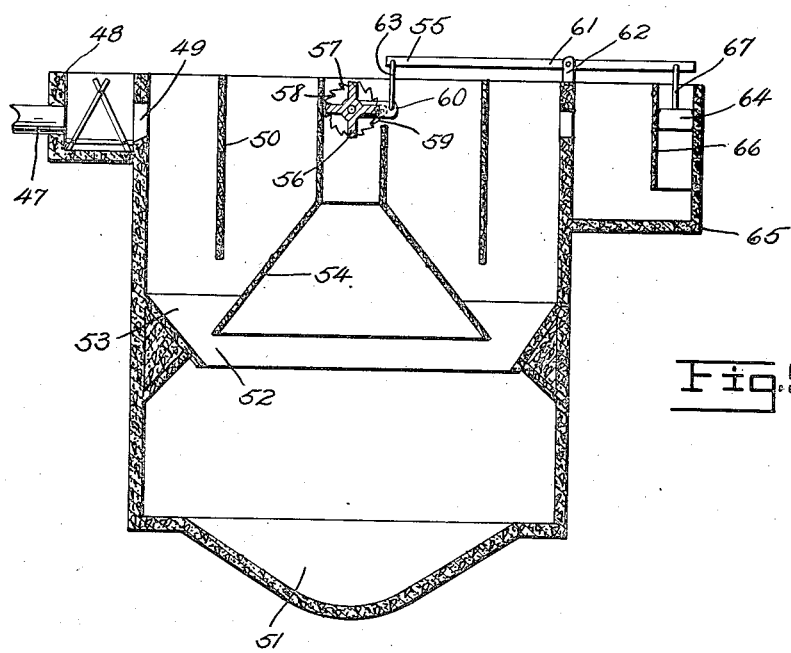

1,439,407

UNITED STATES PATENT OFFICE.

HENRY E. ELROD, OF DALLAS, TEXAS.

SEWAGE-DISPOSAL PLANT.

Application filed August 11, 1921. Serial No. 491,480.

*To all whom it may concern:*

Be it known that I, HENRY E. ELROD, a citizen of the United States, and a resident of the city of Dallas, in the county of Dallas and State of Texas, have invented certain new and useful Improvements in Sewage-Disposal Plants, of which the following is a specification.

My invention relates in general to, a sewage disposal plant and more particularly to a scum disintegrating device for use in connection with a sewage disposal system.

A sewage disposal plant which embodies what is known in this art as an Imhoff tank is used as an illustrative example and into this tank is conducted the sewage. In practice, the sewage is conducted to a chamber known as a sedimentation chamber where the velocity of the sewage is reduced to a point sufficient for the solid matter suspended in the sewage to settle out through an opening provided for the purpose at the bottom of this chamber. This settled solid matter then undergoes digestion, gases being produced as a result of this digestion. These gases rise and by means of baffle plates are directed to gas vents where they escape.

However, this escaping gas carries with it to the surface of the sewage small particles of suspended solid matter which in time forms a scum on top of the sewage in these vents which scum eventually becomes so thick that it forms a seal over the gas vents and thereupon prevents efficient functioning of the plant. This trouble is particularly prevalent in plants embodying Imhoff tanks and makes constant attention to the same necessary to keep the sludge sufficiently agitated and broken up to enable the gas to escape.

It is therefore, the primary object of my invention to provide automatic means operatable by the flow of sewage for agitating and disintegrating this scum whereby the gas vents may be kept free and unobstructed and the efficiency of the plant unimpaired.

My invention contemplates primarily a plurality of agitators or blades mounted at spaced intervals upon chain belts which in turn, are carried by sprocket wheels suitably journalled in or on the walls of the sewage plant. These blades are imposed in such a position that they engage the scum which forms on the top of the sewage in the gas vents and as the chain belt moves forward these blades carry the scum to one or the other end of the vent where it is pushed down under the sewage by the action of the blades, thus preventing an accumulation of scum.

Obviously various means of operating the chain belt may be provided, inasmuch as only a very small movement thereof is necessary to efficiently accomplish the result desired. In the illustrative example of the invention shown on the drawings forming a part of this application a float-actuated means is illustrated, the float being disposed in the usual dosing chamber and by means of proper mechanical elements the vertical movement of the float is transposed into a rotary movement whereby the chain belt, together with the agitators or blades are moved. Thus the sewage flow is utilized for accomplishing the desired result and the necessity for separate operating means is eliminated.

Obviously, however, the skimming or agitating device may be actuated by such mechanical means as an electric motor, gas engine, springs, weights or the like.

Several illustrative examples whereby I am enabled to accomplish the results of my invention will be more fully described and illustrated in the accompanying specification and drawings wherein:

Fig. 1 is a perspective view of an Imhoff tank with my invention embodied therein, Fig. 2 is a longitudinal section thereof, Fig. 3 is a section on lines 3—3 of Fig. 2, Fig. 4 is a top plan view showing a modified form of the operating means, and Fig. 5 is a vertical section of a slightly different form of an Imhoff tank with my invention applied thereto.

Referring now more particularly to Figs. 1 to 3, the first example of my invention will be described. As hereinbefore stated, the invention is shown as applied to a tank of the Imhoff type herein designated by the numeral 10 and provided with an inlet pipe 11 through which the sewage is conducted to this tank. A screen chamber 12 communicates by an opening 13 with a chamber formed by a pair of baffle walls 14. Transverse baffle walls 15 disposed transversely between the baffle walls 14 retard the flow of sewage through this tank whereby the velocity of the sewage is reduced to a point sufficient to enable the solid matter suspended therein to settle out through a slot 16 at the bottom of the chamber, formed by inclining the lower ends of the baffle walls 14.

The solid matter settles out of the sewage and into a sludge chamber 17 provided preferably by forming the bottom of the Imhoff tank hopper-shaped as illustrated in the drawings. A sludge withdrawal line 18 extends preferably upwardly through the tank and off to one side thereof and is provided with a valve 19 contained in a valve compartment 20.

By spacing the baffle walls 14 from the sides of the tank 10 there is provided gas chambers or vents 21 which as clearly illustrated in Figs. 1 and 3, are open to the air at their upper ends. As hereinbefore stated, the solid matter which settles in the sludge chamber undergoes a digestion, from which gases result, these gases rising and upon striking the inclined ends of the baffle walls 14 are directed between the walls 14 and the walls of the tank 10 thus escaping from the open upper sides of these two gas chambers.

There is further provided a dosing chamber 22 containing a syphon discharging device 23 whereby at predetermined intervals the clear sewage may be carried off. All of the parts thus far described are of the usual and standard type and form no part of my present invention.

As hereinbefore stated, the gas escaping from the gas vents 21 carry with it small particles of suspended solid matter which eventually form upon the top of the sewage a scum which if not agitated and destroyed, eventually destroys the efficiency of the plant. In order therefore to eliminate this disadvantage, I provide at the open end of each of the gas vents an agitator consisting of a plurality of spaced blades 24 secured at spaced intervals upon chain belts or sprocket chains 25. Idle sprocket wheels 26 mounted on shafts 27 journalled in the walls or supported on the walls of the plant support these chains at one end of the gas vent while driving sprocket wheels 28 fixed to shafts 29, also mounted in or on the walls of the tank support the other end of the chains. Keyed to the shaft 29 is a ratchet wheel 30 with which cooperates a pawl 31 carried by a pawl arm 32, one end of which is loosely mounted upon the shaft 29.

Within the dosing chamber 22 there is disposed a float 33 movable vertically between the wall of the dosing chamber and a guide 34. Pivotally mounted upon the top edge of the wall of the tank is a rocker arm 35, pivoted to the tank as at 36. A connecting rod 37 connects one end of the rocker arm to the float 33 while a second connecting rod 38 connects the other end of this rocker arm to the pawl arm 32. The pawl and ratchet are arranged in such a manner that as the sewage rises within the dose chamber 22 and consequently moves the float 33 upwardly, the pawl will engage the ratchet wheel and rotate the same, consequently moving the sprocket chains and blades and agitating the scum in the gas vents. When, however, the syphon has functioned to carry off the sewage in the dosing chamber the float will drop by gravity while the pawl slips idly from its ratchet wheel. It is obvious therefore, that the flow of sewage is utilized for effecting a movement of the agitating blades and, as clearly illustrated in Figs. 1 to 3, one float and pawl and ratchet, together with their associated connecting parts suffices for moving the agitating blades contained in the two gas vents. The agitating blades are so disposed that as they are moved forward they engage the scum which forms on the top of the sewage in these gas vents and carry the scum to one end of the vent where it is pushed down under the liquid sewage by the blades, thus keeping the vent free from accumulation of scum.

In Fig. 4 a slightly modified form of a means employed for moving the agitator blades is shown, the other parts of the device however, remaining the same as in Figs. 1 to 3. In this form of my invention, the driving shaft 39, similar to the shaft 29 of the first form described, has fixed thereto a bevel pinion 40 which in turn meshes with a bevel pinion 41 fixed to the end of a shaft 42 suitably journalled in or on the walls of the tank. A float arm 43 one end of which is loosely journalled on the shaft 42, carries on its other end a float 44. A ratchet wheel 45 fixed to the shaft 42 is engaged by a pawl 46 carried by the float arm 43. In this form the guides for the float are eliminated, the float however, being raised by the sewage filling the dosing chamber 22. The manner of operation of this form of the invention is obvious inasmuch as when the float 44 is raised, the pawl 46 by engagement with the ratchet wheel 45 rotates the shaft 42 and through bevel gears 41 and 40 imparts a rotary movement to the shaft 39, upon which was mounted the driving sprocket wheels for moving the sprocket chains carrying the agitator blades.

In Fig. 5 a circular Imhoff tank is shown, this tank however being another form sometimes employed. In this instance the sewage is conducted to the tank through a pipe 47 and flows into a screen chamber 48 and thence through an opening 49 into the tak. A circular baffle wall 50 is provided to retard the flow of sewage through the tank. The solid matter suspended in the sewage settles into a sludge chamber 51 provided in the bottom of the tank through a restricted circular opening 52 formed by an inclined baffle wall 53 and a cooperating conical-shaped baffle wall 54. In these circular Imhoff tanks the gas escapes upwardly through the center of the tank and the gas vent is herein indicated by the numeral 55.

In order to agitate the scum forming in the gas vent 55, I mount a propeller-shaped agitator 56 upon a shaft 57 journalled in or on the walls of the gas vent. A ratchet wheel 58 fixed to the shaft 57 is operated by a pawl 59 carried by a pawl arm 60. The rocker arm 61 pivoted as at 62 has one of its ends connected to the pawl arm 60 by a rod 63. A float 64 working vertically in a dosing chamber 65 between the wall thereof and a guide 66 is connected by a rod 67 to the other end of the rocker arm. Consequently as the sewage rises and falls in the dosing chamber 65 the float will be actuated and through the medium of the parts just described, revolve the agitator 56.

It is obvious from the foregoing that my invention contemplates the provision of agitating means within the gas vent of sewage plants of this general type, which agitating means is operated mechanically. In the illustrative examples hereinbefore described, the variable water level in the dosing chamber has been utilized and to this end my invention contemplates the utilization of the rise and fall of the sewage level in the dosing chamber irrespective of the position of the dosing chamber with respect to the position of the gas vents. In some instances, the dosing chamber may be disposed at some other point and therefore at a different angle with respect to the gas vents. However, in such instances the variable water level in the dosing chamber will still be utilized by re-arranging the details of the mechanical impelling device, all of which may be done without departing from the spirit and scope of this invention.

As has been hereinbefore suggested, various types of floats may be employed for actuating the agitating floats such for instance as an electric motor, gas engine or springs or weights, which would require a manual setting. Inasmuch as only a slight movement of the agitating blades is necessary, the cost or labor involved in any of the hereinbefore suggested power plants will be negligible.

I therefore reserve the right to make such rearrangements and modifications in the structures illustrated and described as may come within the purview of the accompanying claims.

Having thus described my invention, what I claim is:

1. In a sewage disposal plant a tank provided with gas vents, agitators disposed in said vents and means actuated by the sewage for operating said agitators.

2. In a sewage disposal plant the combination with an Imhoff tank provided with gas vents of agitators disposed in said gas vents and automatic means dependent upon the flow of sewage for operating said agitators.

3. In a sewage disposal plant the combination with an Imhoff tank provided with gas vents of agitators disposed in said gas vents and means operated by the flow of sewage for causing said agitators to function.

4. In a sewage disposal plant a tank into which the sewage flows, gas vents for permitting the escape of gas caused by the digestion of the sewage, agitating means disposed in said gas vents and a float mechanically connected to the agitating means and operated by the flow of sewage for causing said agitating means to function.

5. A sewage disposal plant comprising a tank into which the sewage flows, gas vents for permitting the escape of gas caused by the digestion of the sewage, a belt carrying a plurality of spaced agitating blades mounted within each gas vent and means operatable by the sewage for causing a movement of said belt and agitating blades.

6. A sewage disposal plant of the class described comprising a tank into which the sewage flows, a sludge chamber disposed at the bottom of said tank, gas vents for carrying off the gas caused by the digestion of the sewage, agitating means each comprising belts provided with a plurality of spaced blades, wheels for mounting each belt within a gas vent and a float actuated means for moving said belts to cause said blades to function, said float being actuated by the sewage in said tank.

7. A sewage disposal plant comprising a tank into which the sewage flows, gas vents for permitting the escape of gas caused by the digestion of the sewage, a belt carrying a plurality of spaced agitating blades mounted within each gas vent, a float actuated by the sewage within said tank, levers and a pawl and ratchet mechanism connecting said float to said belts for moving the same.

HENRY E. ELROD.